United States Patent [19]
Van Hoof et al.

[11] 3,936,571
[45] Feb. 3, 1976

[54] ADHESIVE TAPE

[75] Inventors: Albert Emiel Van Hoof, Berchem; Georges Arthur Holvoet, Mortsel, both of Belgium

[73] Assignee: AGFA-GEVAERT N.V., Mortsel, Belgium

[22] Filed: June 24, 1974

[21] Appl. No.: 482,562

Related U.S. Application Data

[63] Continuation of Ser. No. 260,201, June 6, 1972, abandoned.

[30] Foreign Application Priority Data

June 7, 1971 United Kingdom............... 19182/71

[52] U.S. Cl.......... 428/355; 260/521 R; 260/535 R; 428/343; 428/411
[51] Int. Cl.²...................... C09J 7/02; B32B 9/04
[58] Field of Search .... 117/122 P, 122 PF, 122 PA, 117/68.5, 76 A; 260/521 R, 535 R; 161/182; 428/355, 411

[56] References Cited
UNITED STATES PATENTS

| | | | |
|---|---|---|---|
| 2,370,256 | 2/1945 | Niederl | 260/520 |
| 2,554,441 | 5/1951 | Cross et al. | 260/613 |
| 2,745,857 | 5/1956 | Britton et al. | 260/535 X |
| 2,838,421 | 6/1958 | Sohl | 428/355 X |
| 3,513,188 | 5/1970 | Smith | 260/473 |
| 3,556,835 | 1/1971 | Sorell | 117/68.5 |
| 3,663,229 | 5/1972 | Ville et al. | 96/67 |
| 3,669,798 | 6/1972 | Brown | 156/334 |

*Primary Examiner*—Harold Ansher
*Assistant Examiner*—Alan T. McDonald
*Attorney, Agent, or Firm*—William J. Daniel

[57] ABSTRACT

An adhesive tape that tenaciously adheres to the surface of films, paper, wood, plastic, metal, stone and the like, by simply pressing it thereon, and that can easily be removed with water or aqueous alkaline solutions, comprises a support and an adhesive layer consisting of a homogeneous mixture of at least one water-soluble and/or alkali-soluble polymer and of a tackifier consisting of a carboxylated monoether of a polyglycol.

9 Claims, No Drawings

ADHESIVE TAPE

This is a continuation of Ser. No. 260,201, filed June 6, 1972, now abandoned.

The invention relates to an adhesive tape the adhesive layer of which is tacky in dry condition, water-soluble and/or alkali-soluble and adheres tenaciously to a surface when it is pressed thereon.

In the photographic industry it occurs very often that rolls of film or paper must be spliced in order to make possible a continuous treatment thereof e.g. coating with one or more layers, cutting into sizes etc. For this purpose pressure-sensitive adhesive tapes with a water-insoluble adhesive coating are generally used. While the film or paper is worked up into the size desired, the parts adhering to each other (i.e. the spliced parts) must be picked out. They must not get mixed with the common waste film or waste paper intended for recuperation. In view of the recuperation of the base material of the photographic waste film or waste paper the said film or paper is first treated with warm water or warm aqueous solutions of acid or alkaline substances: the common adhesive tapes having water-insoluble adhesive layers are not removed by the water-treatment and would remain in the recuperated film or paper as an undesirable and interfering element.

In many other applications sticking labels are used e.g. on clothes, apparatus, utensils, index cards etc. for applying all kinds of indications such as e.g. prices. These sticking labels must adhere to the article by merely pressing and later on must be capable of being simply removed without damage to the articles.

It has been proposed to use adhesive tape the adhesive of which is water-soluble and consists of a mixture of a water-soluble polyvinyl carboxylic acid and a hydroxypolyalkylene. However, the adhesive power of layers with this composition is insufficient for some applications. Moreover, these adhesive layers lose their adhesive power after some time.

According to the invention a tape has been found that tenaciously adheres to the surface of films, paper, wood, plastic, metal, stone and the like, by simply pressing it thereon, the tape comprising a support and a water-soluble and/or alkali-soluble adhesive layer consisting of a homogeneous mixture of at least one water-soluble and/or alkali-soluble polymer and of a tackifier consisting of a carboxylated monoether of a polyglycol, preferably corresponding to the formula:

$$R - X - O - A - COOH$$

wherein:

R represents an alkyl-substituted phenyl group, the alkyl group of which contains 8 or 9 carbon atoms, or a saturated or mono-unsaturated aliphatic hydrocarbon of 12 to 18 carbon atoms, A represents methylene or ethylene, and X stands for 7 to 30 recurring oxyethylene groups, which may be interrupted by one or more oxypropylene groups.

Still more preferred are water-soluble and/or alkali-soluble tackifiers corresponding to the general formula:

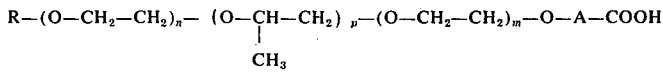

wherein:

R and A have the same significance as indicated above, p is 0, 1 or 2, n is an integer from 7 to 30 when p =0, or 4 or 5 when p = 1 or 2, m = 0 when p =0, or m =4 or 5 when p = 1 or 2.

By water-soluble and/or alkali-soluble adhesive layers are understood layers that can be easily removed with water or aqueous alkaline solutions, whether or not with the application of mechanical rubbing. Analogously, are understood under water-soluble and/or alkali-soluble polymers, those polymers that readily dissolve in water or in aqueous alkaline media.

Suitable compounds that can be used as tackifiers in an adhesive tape according to the invention are e.g.:

1. 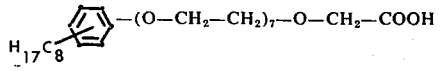

2. 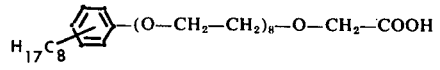

3. 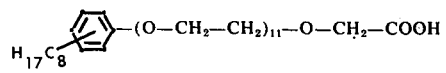

4. 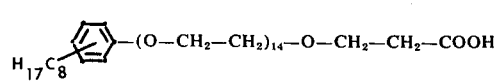

5. $CH_3-(CH_2)_{11}-(O-CH_2-CH_2)_{30}-O-CH_2-COOH$
6. $CH_3-(CH_2)_{16}-(O-CH_2-CH_2)_{20}-O-CH_2-COOH$
7. $CH_3-(CH_2)_7-CH=CH-(CH_2)_7-CH_2-(O-CH_2-CH_2)_{10}-O-CH_2-COOH$
8. $CH_3-(CH_2)_7-CH=CH-(CH_2)_7-CH_2-(O-CH_2-CH_2)_9-O-CH_2-COOH$

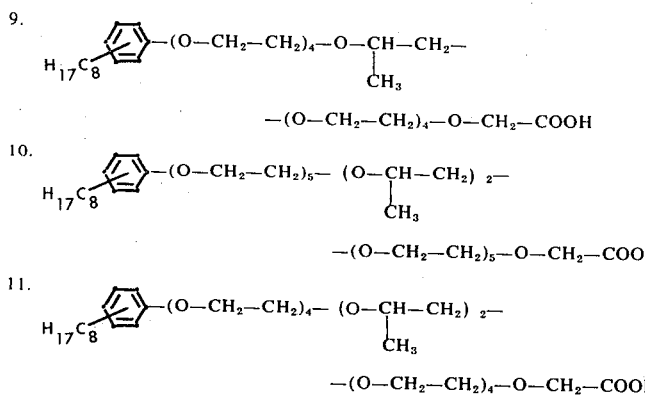

When a water-soluble and/or alkali soluble adhesive according to the invention is coated e.g. on a cellulose triacetate support, the adhesive tape obtained can be used for splicing rolls of cellulose triacetate films, which may carry a photographic silver halide emulsion layer or a gelatin backing layer. Films that are spliced by means of adhesive tape according to the invention can now undergo the recuperation treatment directly without leaving interfering elements.

Photographic films with other kinds of supports such as cellulose acetobutyrate supports, cellulose nitrate supports, polyester supports etc. or photographic papers can also be spliced by means of adhesive tape according to the invention. These spliced materials show the same advantages. Care should be taken, however, that the support of the adhesive tape is similar to that of the photographic material to be spliced.

Since in general in most of the combinations no chemical reaction takes place in the adhesive between the polymeric binder and the water-soluble tackifier, the adhesive remains completely water-soluble and/or alkali soluble.

When the tape is to be wound directly in roll form, a suitable liner is used such as a film of polyethylene or a paper coated on one or both sides with a silicone resin or with polyethylene in order to prevent bonding together of adjacent convolutions of the adhesive tape. This is also the case when the adhesive layer is applied to both sides of the support whereby a double bonding adhesive tape is formed.

The water-soluble and/or alkali-soluble adhesive can be applied to the support from a solution in a volatile organic solvent such as methanol and ethanol, from an aqueous solution or from a mixture of both. By evaporation of the solvent an adhesive tape is obtained, which is ready for immediate use.

The polymeric binder of the adhesive can be chosen from a large series of polymers. The only restriction put on the polymers is that they must be water-soluble and/or alkali-soluble and compatible with the used tackifier. Suitable water-soluble and alkali-soluble polymers are e.g., polyvinylpyrrolidone, polyacrylic acid, polymethacrylic acid, copolymers of acrylic acid with alkyl esters of acrylic or methacrylic acid wherein the alkyl group comprises 1 to 4 carbon atoms such as methyl acrylate and n-butyl acrylate, with the proviso that the acrylic acid content is at least above 70 % in the case of methyl acrylate and above 85 % in the case of n-butyl acrylate, further copolymers of maleic acid and e.g. ethylene, vinyl methyl ether and vinyl acetate, dimethylhydantoin-formaldehyde resin and polyethylene imine.

Suitable alkali-soluble polymers are copolymers of acrylic acid and methyl acrylate or ethyl acrylate wherein respectively at least 5 or 10 % by weight of acrylic acid is present, copolymers of methacrylic acid and methyl acrylate, ethyl acrylate or n-butyl acrylate wherein respectively at least 10, 10 or 15 % by weight of methacrylic acid is present.

Also latices formed from copolymers of acrylic or methacrylic acid and at least one lower alkyl ester of acrylic acid containing a high ratio of the latter units are equally suitable.

The polymerisation of acrylic acid and of methacrylic acid and the copolymerisation of these acids with lower alkyl esters of acrylic acid (methyl, ethyl, butyl) may be carried out in solution in water, in methanol or in mixtures of both according to known polymerisation techniques, e.g. according to the methods described in Houben-Weyl, "Methoden der organischen Chemie", Makromolekulare Stoffe, vol. 14/1, pages 1018-1021, Georg Thieme Verlag, Stuttgart (1961). Polymerisation may also occur according to known methods in a non-solvent, whereby the polymer formed precipitates out of solution. In the same way emulsion copolymerisation techniques may be applied when mixtures are used of acrylic acid or methacrylic acid with alkyl esters thereof, wherein the ratio of acid component is relatively low (30 to 55 % by weight). The ratio of the amount of polymeric binder present to the amount of tackifier used can vary within very wide limits and depends among others on the relative humidity interval in which the adhesive tape is to be used. Best results are attained, however, when the amount of tackifier is from 100 to 280 % by weight relative to the amount of polymeric binder present.

An aqueous or organic solution of the water-soluble and/or alkali-soluble polymer and of the tackifier according to the invention can also be used as glue for adhering paper to paper.

Adhesive tapes according to the invention can be applied e.g. as labels to any support such as clothes, apparatuses, utensils, metal, stone and the like.

In the following examples the adhesive power of the adhesive tape is measured as follows: the straight cut sides of 2 sheets of, e.g., cellulose triacetate film provided with a photographic light-sensitive emulsion layer are arranged in edge-to-edge relationship with the emulsion side turned upwards. A piece of the adhesive tape measuring 1.5 cm by 5 cm is pressed to the butt-end of one of the sheets and the tip portion of the other sheet, both sheets being overlapped for 2.5 cm with tape. Both sheets are now put between the clamps of a Schopper dynamometer and the pulling force at which the pressure-sensitive tape gets loose is measured in kg.

The following examples illustrate the invention.

EXAMPLE 1

A solution with the following composition was prepared:

| | |
|---|---|
| dimethylhydantoin-formaldehyde resin | 1300 g |
| polyacrylic acid | 2000 g |
| tackifier No. 2 (see list above) | 4400 g |
| methanol | 6000 ml. |

The solution was applied to a cellulose triacetate film in such a way that after evaporation of the solvent 25 g of solids remained per sq.m. When winding the material obtained in rolls a paper coated with silicone resin was interwound as liner within the successive convolutions of the tape.

The resulting adhesive tape could be used for splicing photographic films with cellulose triacetate film supports. The adhesive power of the adhesive layer measured as described above was about 13 kg.

The adhesive layer could readily be washed away in water so that the spliced parts of the cellulose triacetate film could directly be used in recuperation treatments without leaving interfering elements.

EXAMPLE 2

The process of Example 1 was repeated with the sole difference that tackifier No. 2 was replaced by 3200 g of tackifier No. 7. The resulting adhesive tape could be used for splicing photographic films with cellulose triacetate film supports. The adhesive power of the adhesive layer was about 13 kg.

EXAMPLE 3

The process of Example 1 was repeated with the sole difference that tackifier No. 2 was replaced by 3200 g of tackifier No. 3. The resulting adhesive tape could be used for splicing cellulose triacetate film supports. The adhesive power of the adhesive layer was about 14 kg.

EXAMPLE 4

The process of Example 1 was repeated with the sole difference that the 4400 g of tackifier No. 2 were replaced by 4800 g of the following tackifiers (see Table), except with tackifier No. 8 of which 3600 g were used. The solutions formed were also applied to a cellulose triacetate film as indicated in Example 1. Adhesive tapes resulted, which could be used to splice photographic films having cellulose triacetate film supports. The adhesive layers readily dissolved in water so that cellulose triacetate films spliced with the adhesive tape could be recuperated after the adhesive layer had been washed away in a water bath.

The adhesive power of the adhesive tapes was as follows:

| | | | |
|---|---|---|---|
| with tackifier | No. 1 | 5.5 kg | pulling force |
| " | No. 4 | 4.0 kg | " |
| " | No. 5 | 2.0 kg | " |
| " | No. 6 | 1.5 kg | " |
| " | No. 8 | 8.5 kg | " |
| " | No. 9 | 5.5 kg | " |
| " | No. 10 | 3.0 kg | " |
| " | No. 11 | 1.5 kg | " |

EXAMPLES 5 to 11

Seven adhesive coating compositions were prepared composed as follows:

| Example | DMHF | Binder | Tackifier | Water or methanol |
|---|---|---|---|---|
| | in parts by weight | | | |
| 5 | 130 | 200 | 440 | 600 |
| 6 | 130 | 660 | 440 | 14 |
| 7 | 130 | 660 | 440 | 1000 |
| 8 | 130 | 660 | 440 | 1000 |
| 9 | 130 | 660 | 440 | 1000 |
| 10 | 130 | 1000 | 440 | 1000 |
| 11 | 130 | 770 | 440 | 1750 |

In the above table DMHF is the abbreviation for dimethylhydantoin-formaldehyde resin, and the tackifier used in the Examples is the compound listed as No. 2 in the list of useful tackifiers given in the description.

The following binders were used:

EXAMPLE 5 : a water-soluble polyacrylic acid having an intrinsic viscosity of 0.6 dl/g in methanol at 25°C added to the coating composition as a 30 % by weight solution in methanol.

EXAMPLE 6 : a copolymer of acrylic acid and methyl acrylate (60:40 % by weight) that has been prepared as a solution in methanol. The copolymer is added to the coating composition in the form of a 30 % by weight solution in methanol.

EXAMPLE 7 : a copolymer of acrylic acid and methyl acrylate (85:15 % by weight) that has been prepared as a solution in water. The copolymer is added to the coating composition in the form of a 30 % aqueous solution.

EXAMPLE 8 : a water-soluble copolymer of acrylic acid and methyl acrylate (85:15 % by weight) prepared in methanol solution, the copolymer is added to the coating composition as a 30 % solution in methanol.

EXAMPLE 9 : a copolymer of acrylic acid and methyl acrylate (85:15 % by weight) prepared in methanol solution, but from which the methanol has been distilled after the addition of water. The copolymer is added to the coating composition as a 30 % aqueous solution.

EXAMPLE 10 : a copolymer of acrylic acid and n-butyl acrylate (85:15 % by weight) prepared in aqueous medium. It is added as a 20 % aqueous solution.

EXAMPLE 11 : a copolymer of methacrylic acid, methyl methacrylate and n-butyl acrylate (35:30:35 % by weight) prepared by emulsion polymerisation techniques. The latex is mixed with the tackifier and to this mixture are added the DMHF and the amount of water indicated.

The adhesive power of the adhesive tapes was measured as indicated above at 45 % of relative humidity for adhesive tapes in which the adhesive layer comprises 25 g of dry material per sq.m. The results are as follows.

| Example | Pulling force | |
|---|---|---|
| 5 | 12 | kg |
| 6 | 13 | kg |
| 7 | 7.5 | kg |
| 8 | 12 | kg |
| 9 | 11 | kg |
| 10 | 9 | kg |
| 11 | 7.5 | kg |

We claim:

1. An adhesive tape comprising a support and an adhesive layer characterized in that said adhesive layer is water-soluble and/or alkali-soluble and is composed of a homogeneous mixture of at least one water-soluble and/or alkali-soluble polymer and a tackifier consisting of a carboxylated monoether of a polyglycol which corresponds to the general formula:

$$R - X - O - A - COOH$$

wherein:
R represents an alkyl-substituted phenyl group, the alkyl group of which contains 8 or 9 carbon atoms, or a saturated or mono-unsaturated aliphatic hydrocarbon of 12 to 18 carbon atoms,
A represents methylene or ethylene, and
X stands for 7 to 30 recurring oxyethylene groups, which may be interrupted by one or more oxypropylene groups.

2. An adhesive tape according to claim 1, wherein the carboxylated monoether of a polyglycol corresponds to the general formula:

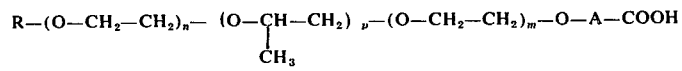

wherein:
R and A have the same significance as in claim 1,
$p$ is 0, 1 or 2,
$n$ is an integer from 7 to 30 when $p=0$, or $n=4$ or 5 when $p=1$ or 2,
$m = 0$ when $p=0$, or $m=4$ or 5 when $p=1$ or 2.

3. An adhesive tape according to claim 1, wherein the adhesive layer comprises 100 to 280 % of tackifier relative to the weight of water-soluble and/or alkali-soluble polymer present.

4. An adhesive tape according to claim 1, wherein the tackifier corresponds to the formula:

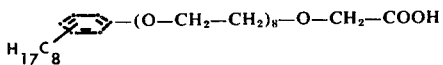

5. An adhesive tape according to claim 1, wherein the tackifier corresponds to the formula:

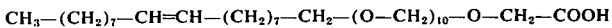

6. An adhesive tape according to claim 1, wherein the tackifier corresponds to the formula:

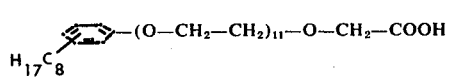

7. An adhesive tape according to claim 1, wherein the water-soluble and alkali-soluble polymer is polyacrylic acid.

8. An adhesive tape according to claim 1, wherein the water-soluble and/or alkali-soluble polymer is a copolymer of acrylic acid with an alkyl ester of acrylic acid or methacrylic acid, wherein the alkyl group comprises 1 to 4 carbon atoms.

9. The adhesive tape of claim 1 wherein said tackifier is present in an amount at least equal to the amount of water-soluble and/or alkali-soluble polymer present in said adhesive layer.

* * * * *

UNITED STATES PATENT AND TRADEMARK OFFICE
CERTIFICATE OF CORRECTION

PATENT NO. : 3,936,571
DATED : February 3, 1976
INVENTOR(S) : Albert Emiel Van Hoof et al It is certified that error appears in the above-identified patent and that said Letters Patent are hereby corrected as shown below:

In the Heading, Item [30] Foreign Application Priority Data, should be corrected to read:

-- June 7, 1971 (Prov.) United Kingdom.......19182/71
   May 26, 1972 (Comp.) --.

Signed and Sealed this sixth Day of April 1976

[SEAL]

Attest:

RUTH C. MASON
Attesting Officer

C. MARSHALL DANN
Commissioner of Patents and Trademarks